(12) United States Patent
Gray (10) Patent No.: US 7,513,531 B2
(45) Date of Patent: Apr. 7, 2009

(54) SIMPLIFIED HEIGHT ADJUSTER FOR D-RING

(75) Inventor: Mark F. Gray, Sterling Heights, MI (US)

(73) Assignee: Takata Seat Belts, Inc., Auburn Hills, MI (US)

( * ) Notice: Subject to any disclaimer, the term of this patent is extended or adjusted under 35 U.S.C. 154(b) by 388 days.

(21) Appl. No.: 11/242,758

(22) Filed: Oct. 4, 2005

(65) Prior Publication Data

US 2007/0075539 A1 Apr. 5, 2007

(51) Int. Cl.
*B60R 22/20* (2006.01)
(52) U.S. Cl. .................. 280/801.2; 280/808; 297/483
(58) Field of Classification Search ............ 248/222.51, 248/297.31; 280/801.2, 808; 297/483, 486; B60R 22/20
See application file for complete search history.

(56) References Cited

U.S. PATENT DOCUMENTS

| | | | | |
|---|---|---|---|---|
| 4,453,741 A | * | 6/1984 | Hipp et al. ............... | 280/801.2 |
| 4,470,618 A | * | 9/1984 | Ono ........................ | 280/801.2 |
| 4,500,115 A | * | 2/1985 | Ono ........................ | 280/801.2 |
| 4,522,426 A | | 6/1985 | Weman | |
| 4,564,219 A | | 1/1986 | Baden et al. | |
| 4,579,368 A | * | 4/1986 | Kawade et al. ........... | 280/801.2 |
| 4,720,147 A | | 1/1988 | Takada | |
| 4,762,338 A | | 8/1988 | Hayden | |
| 4,786,081 A | | 11/1988 | Schmidt | |
| 4,818,023 A | | 4/1989 | Griesemer | |
| 4,826,210 A | | 5/1989 | Schmidt | |
| 4,840,403 A | | 6/1989 | Escaravage | |
| 4,840,405 A | | 6/1989 | Escaravage | |
| 4,867,477 A | | 9/1989 | Escaravage | |
| 4,871,192 A | | 10/1989 | Escaravage et al. | |
| 4,986,570 A | | 1/1991 | Quinting | |
| 5,016,916 A | | 5/1991 | Yokote et al. | |
| 5,044,666 A | | 9/1991 | Griesemer | |
| 5,149,136 A | | 9/1992 | Maekawa et al. | |

(Continued)

FOREIGN PATENT DOCUMENTS

DE 3611954 A1 * 5/1987

(Continued)

*Primary Examiner*—Faye M. Fleming
*Assistant Examiner*—Laura Freedman
(74) *Attorney, Agent, or Firm*—Fitch, Even, Tabin & Flannery (57) ABSTRACT

A seat belt height adjuster for anchoring a seat belt is provided in a preferred form with three relatively simple component parts comprising a slider, a rail, and a bent spring. One end of the slider is biased by the bent spring so that a portion of the slider is spaced from the rail and to position locking protrusions on the slider body into at least one opening in the rail to lock the height adjuster at the desired height position. To adjust the location of the slider along the rail, a pushing force on the one end of the slider compresses the spring and removes the locking protrusions from the rail opening thereby allowing sliding of the slider along the rail. The slider pivots about its other end which is engaging the rail. Upon release of the pushing force, the spring expands and biases the locking protrusion into a rail opening. The spring may be a simple V or U-shaped, leaf spring and the slider may be a single, integral piece of metal.

11 Claims, 7 Drawing Sheets

U.S. PATENT DOCUMENTS

| | | |
|---|---|---|
| 5,205,588 A | 4/1993 | Yamaoka et al. |
| 5,280,959 A | 1/1994 | Nanbu |
| 5,692,780 A | 12/1997 | Yasui |
| 5,908,205 A | 6/1999 | Griesemer |
| 6,123,391 A | 9/2000 | Boelstler et al. |
| 6,186,548 B1 | 2/2001 | McFalls |
| 6,276,720 B1 | 8/2001 | Saito et al. |
| 6,334,629 B1 | 1/2002 | Griesemer et al. |
| 6,336,663 B1 * | 1/2002 | Ando .................. 280/801.2 |

FOREIGN PATENT DOCUMENTS

| | | | |
|---|---|---|---|
| EP | 125860 A1 | * | 11/1984 |
| EP | 133572 A2 | * | 2/1985 |
| JP | 59029537 A | * | 2/1984 |

\* cited by examiner

SIMPLIFIED HEIGHT ADJUSTER FOR D-RING

FIELD OF THE INVENTION

This invention relates to a shoulder belt height adjuster for a safety belt or seat belt that is attached to a pillar of a vehicle usually in a three-point seat belt system.

BACKGROUND OF THE INVENTION

A large number of prior art shoulder height adjustment mechanisms are available and have been described in various patents for adjusting the incremental height and location of the shoulder belt which is usually mounted to a turning loop or D-ring affixed to the height adjuster to accommodate the various positions that different sizes of occupants of a vehicle desire for the seat belt to be anatomically, correctly positioned for best results. Usually the belt passes through the swivel D-ring which may be freely pivotal about the axis of a bolt which is connected to a slider of the height adjuster. The vehicle passenger will adjust the height of the slider along an internal guide rail which usually has a series of openings spaced at different heights into which a portion of the slider or other mechanism is positioned to lock the slider and thereby the swivel D-ring at the desired height. From a mechanical standpoint the height adjuster must be sufficiently strong to withstand the loads which are encountered during a vehicle accident.

Many of the prior art height adjusters have had a number of parts or complex parts which are expensive to manufacture and to assemble for use in the height adjuster. Particularly there is a spring which biases the slider to a locking position in which portions such as locking protrusions or lugs on the slider fit into the openings or holes formed in the guide rail until such time as there is a need for height adjustment. For height adjustments, the vehicle occupant typically will operate an actuator button or press the slider or D-ring itself to compress the spring and to remove the locking protrusions from the locking position in the rail so that the slider may be shifted vertically along the rail. When the force compressing the spring is released, the protrusions are again fitted into locking openings in the rail to thereby lock the height adjuster in the newly adjusted position that is desired by the user. From a vehicle occupant standpoint, it is preferred that the height adjuster be easy to use and be readily apparent as to how it is to be used without the user having to consult an owner's manual or the like. Because of the varying capabilities of the passengers, it is preferred that the height adjuster require only a low force operation and yet still have a good, secure locking condition of the slider relative to the rail. From the manufacturing standpoint, it is particularly desirable to reduce the part count and the complexity of the parts so as to provide a relatively inexpensive height adjuster which is still easy to use and can be operated with a relatively low force.

There is prior art that purports to disclose height adjusters of relatively simple design such as in U.S. Pat. No. 4,180,023, but in that instance the slider body comprises an upper portion or part and a lower portion or part which are welded together to form the slider. The welding operation and the joining of two separate parts defeats the goal of lowering costs resulting in a high cost part from a manufacturing perspective. U.S. Pat. No. 5,044,666 discloses a height adjust mechanism with a very complex leaf spring element which extends essentially over the length and the width of the slider and is connected with the slider to form a clamping module along the rail. This large leaf spring and slider adjustment element are connected by a protruding portion on the slidable adjustment element extending through a slot in the spring. Further, the guide bar of the '666 patent has a large, central longitudinally extending slot through which portions of the clamping module extend. The large slot can make the flat guide bar weaker than is desired. To this end, the '666 patent also teaches more complexly configured and thus costly guide bars such as with thick, longitudinal upstanding edge walls or a C-shaped channel guide bar.

SUMMARY OF THE INVENTION

In accordance with a preferred aspect, there is provided a new and improved height adjuster for a seat belt which has a reduced part count, and has relatively simple rather than complex parts and which has a simplified operation. This is achieved in the preferred form by having a height adjuster assembly formed of three component parts comprising a slider, a rail and a bent spring. The slider has opposite upper and lower ends spaced longitudinally from each other, and front and back sides that extend between the ends. Preferably, the sides have a larger spacing from each other at the lower end of the slider than at the upper end. The spring is positioned between the rail and the slider biasing the back side of the slider at the lower end of the slider into a locking position while holding the front side of the slider at this lower end at an outward spaced position when the slider is in the locking position. To shift the slider for vertical height adjustment, the seat belt passenger will push on the front side that is spaced from the rail to pivot the slider about the upper end to remove protrusions on the slider from the rail opening so that the slider is in a released position to be moved vertically up or down the rail.

In accordance with another aspect, the slider is provided with a U-shaped body having integral legs for sliding along the rail and integral protrusions formed on the legs for protruding into openings in the rail in the locking position. In one form, the slider carries a D-ring and a bolt about which the D-ring is mounted for turning about the axis of the bolt which secures the D-ring to the slider. The slider is also provided with an inclined slider body having the locking lugs or protrusions at a larger end at which the leaf spring is positioned to be compressible to shift the slider from its locked position. The smaller end of the slider body rests against the rail and serves as a fulcrum so that there is a mechanical advantage to allow a low amount of force to be used to compress the spring. Usually, the user pushes on the D-ring itself to unlock the height adjuster for movement, although they can also push on the lower, larger end of the slider body.

In accordance with a further aspect, the spring is a simple U-shaped bent spring that has a first leg engaging the rail and for sliding along the rail and has a second leg which is attached or otherwise secured to the spaced side of the slider body. The leaf spring is very simple with its U or V-shaped configuration and preferably has an inturned end for sliding along the rail surface without catching thereon.

DETAILED DESCRIPTION OF THE PREFERRED EMBODIMENT

Figure 1:
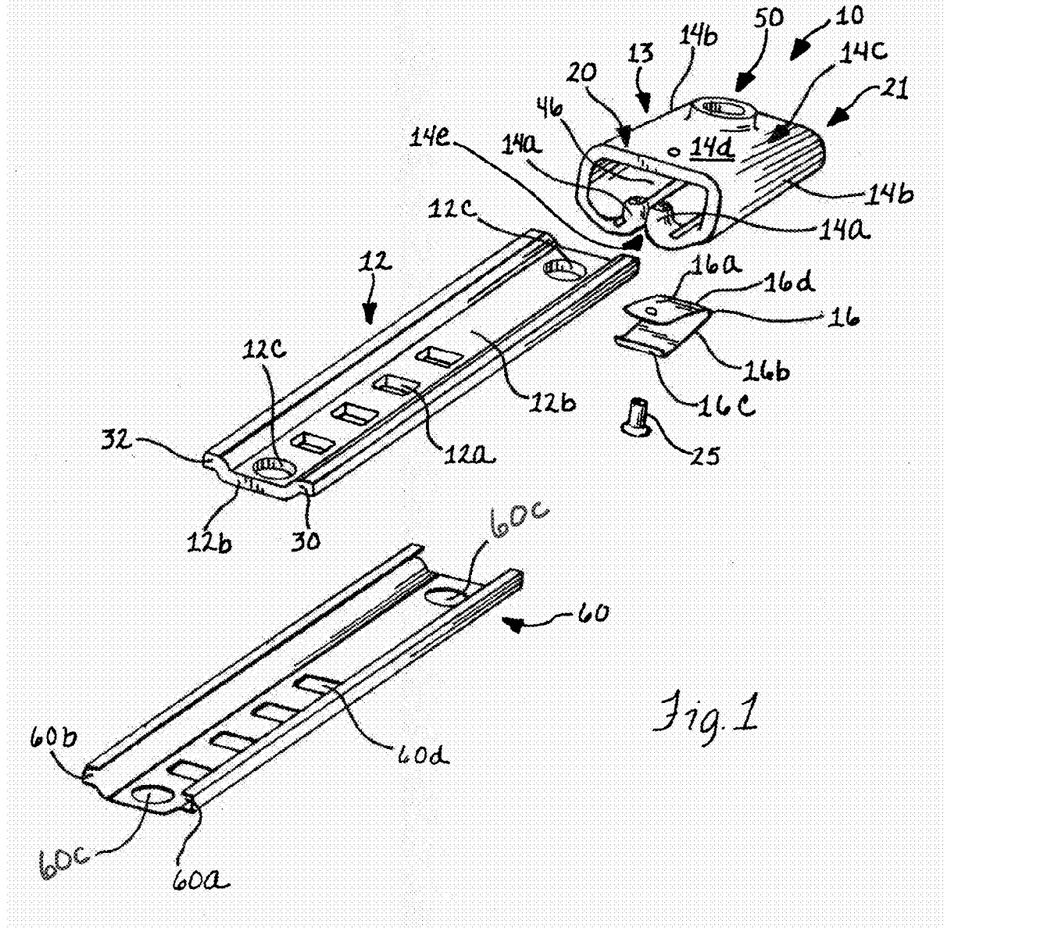
FIG. 1 is an exploded, perspective view of a height adjuster for a D-ring in accordance with the present invention showing a slider having locking lugs, a guide rail, a bent leaf spring and a trim cover for the height adjuster.
Figure 2:
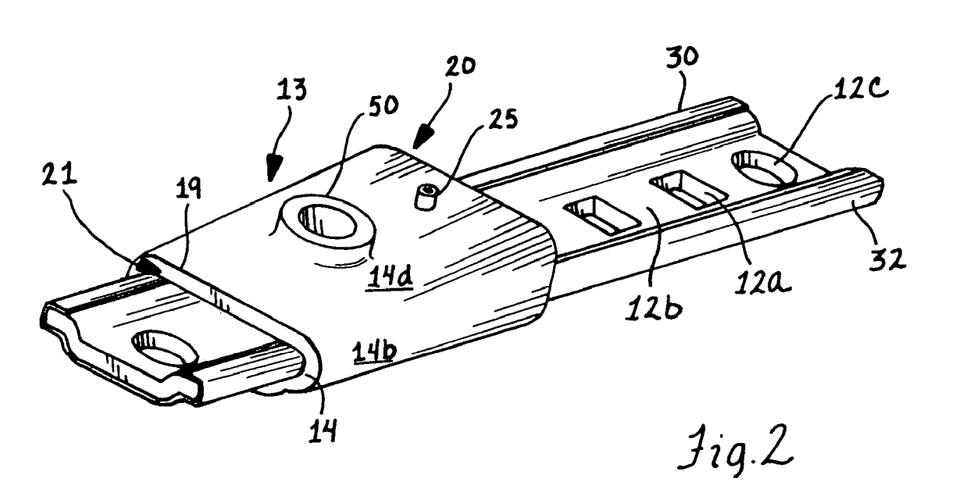
FIG. 2 is a view of the height adjuster of FIG. 1 in an assembled condition.
Figure 3:
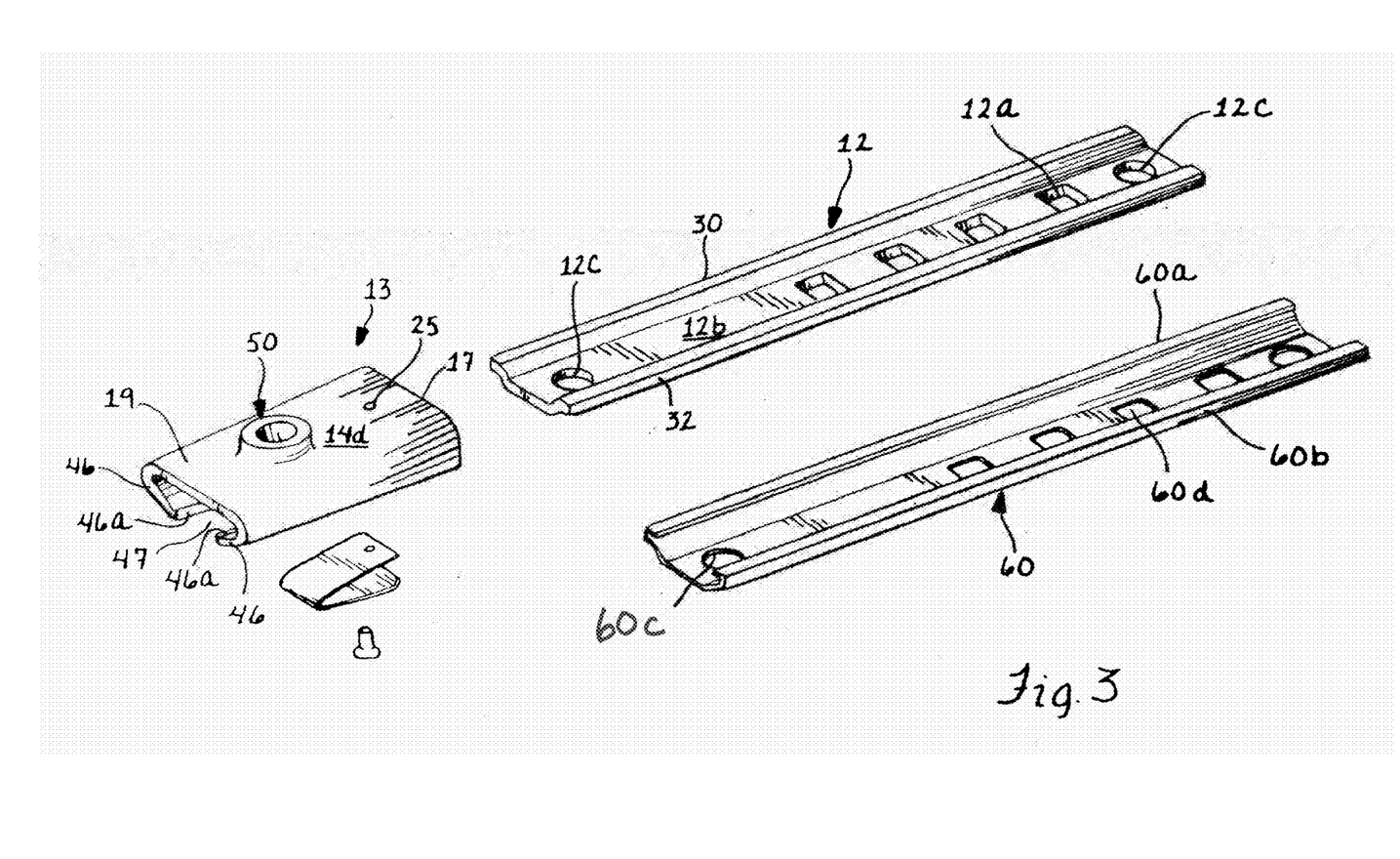
FIG. 3 is an exploded, perspective view similar to FIG. 1 showing the slider, spring, rail and trim cover.
Figure 4:
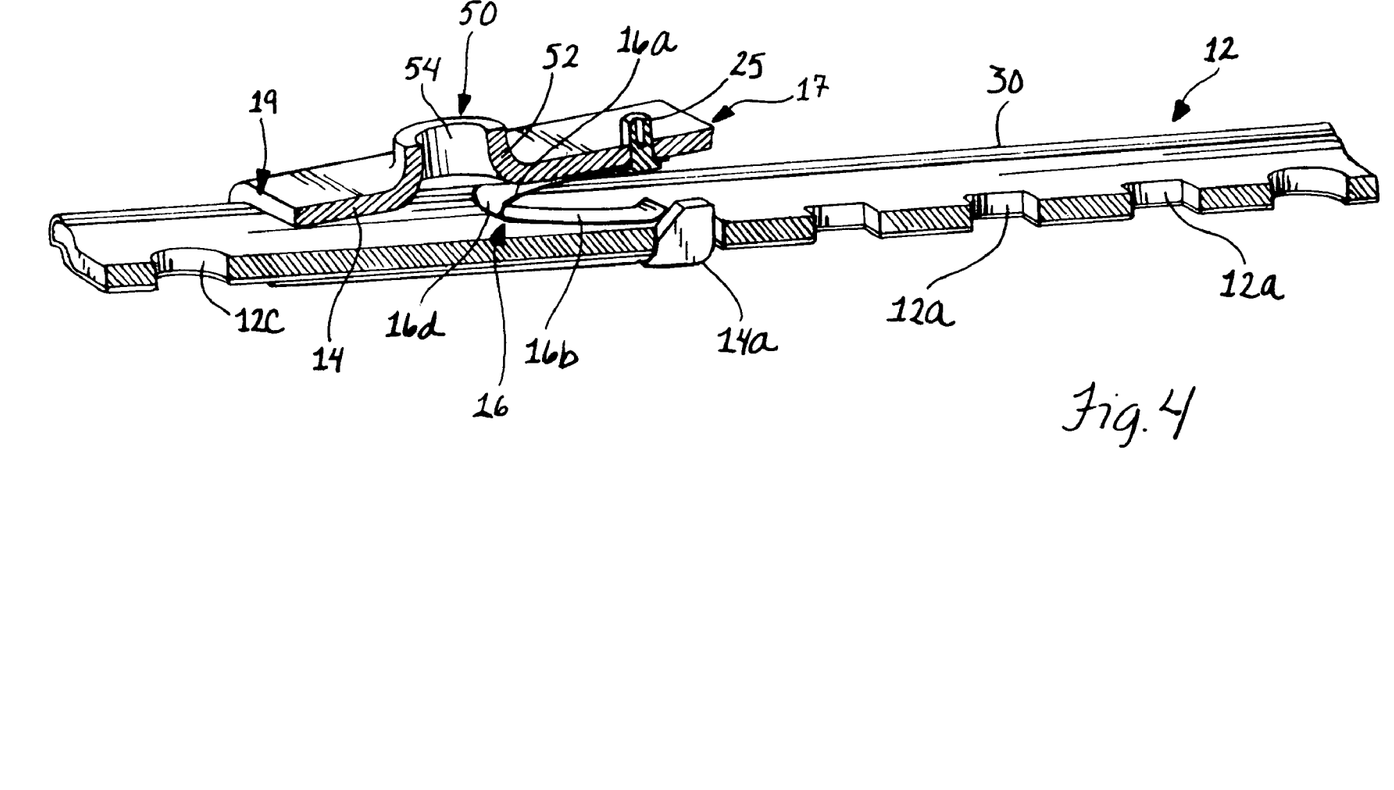
FIG. 4 is a sectional, perspective view taken substantially longitudinally of the rail and showing one of the locking lugs of the slider inserted into an opening in the guide rail for fixing the slider in a locked position along the rail.
Figure 5:
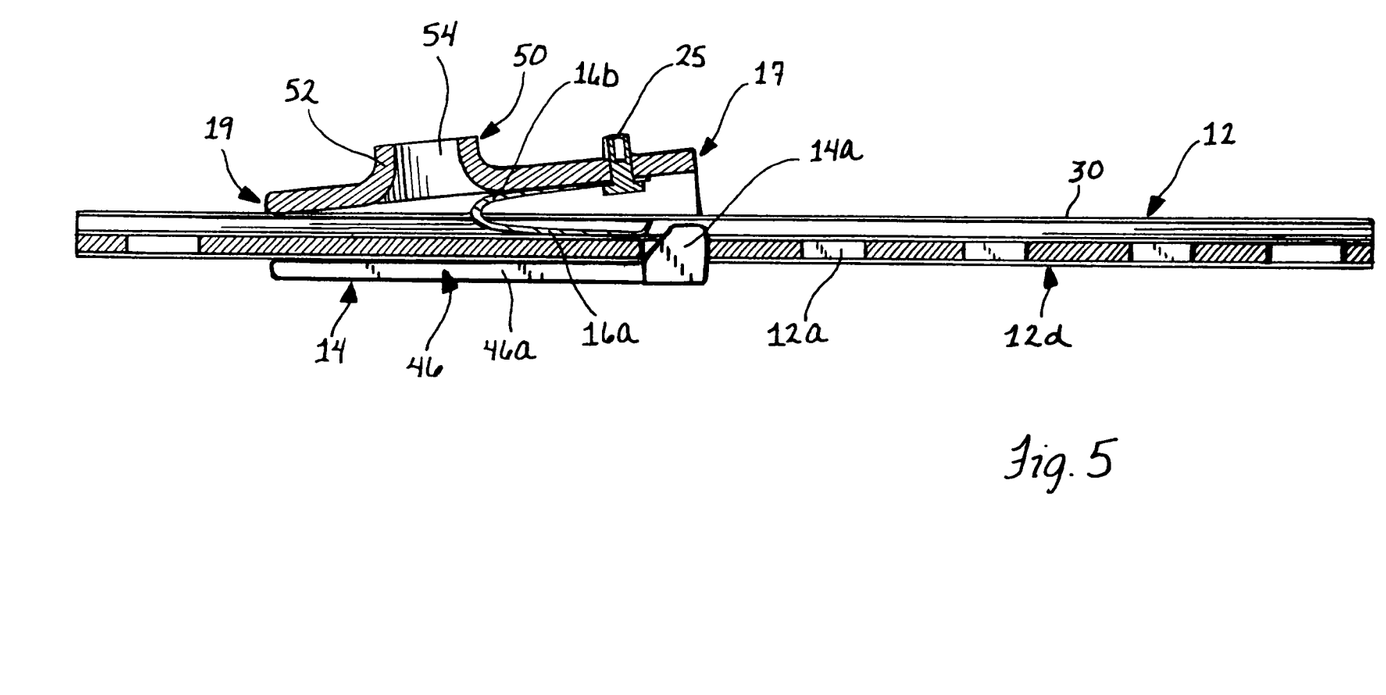
FIG. 5 is a cross-sectional view similar to FIG. 4 showing the slider biased into the locked position.

In FIGS. 1-3, a guide rail 12 and slider 13 are depicted with the guide rail 12 having locking openings 12a which are spaced along an interior web 12b of the rail at substantially uniformly spaced locations, and the slider 13 having a body 14 that has one or more protrusions 14a, each formed on the inner ends of wrap-around leg portions 14b of the slider body 14 to be inserted into the openings 12a to provide a central, load-bearing, locking position for the slider 14 longitudinally along the rail 12. In this locking position as shown in FIGS. 2, 4 and 5, the inturned leg portions 14b are wrapped around the flanged edges 30 and 32 of the rail, the upper end 21 of the slider body 14 is resting on the rail, and the pair of protrusions 14a at the backside 14e of the slider body 14 are inserted into a locking opening 12a from the back or rear side 12d of the rail 12.

Figure 6:
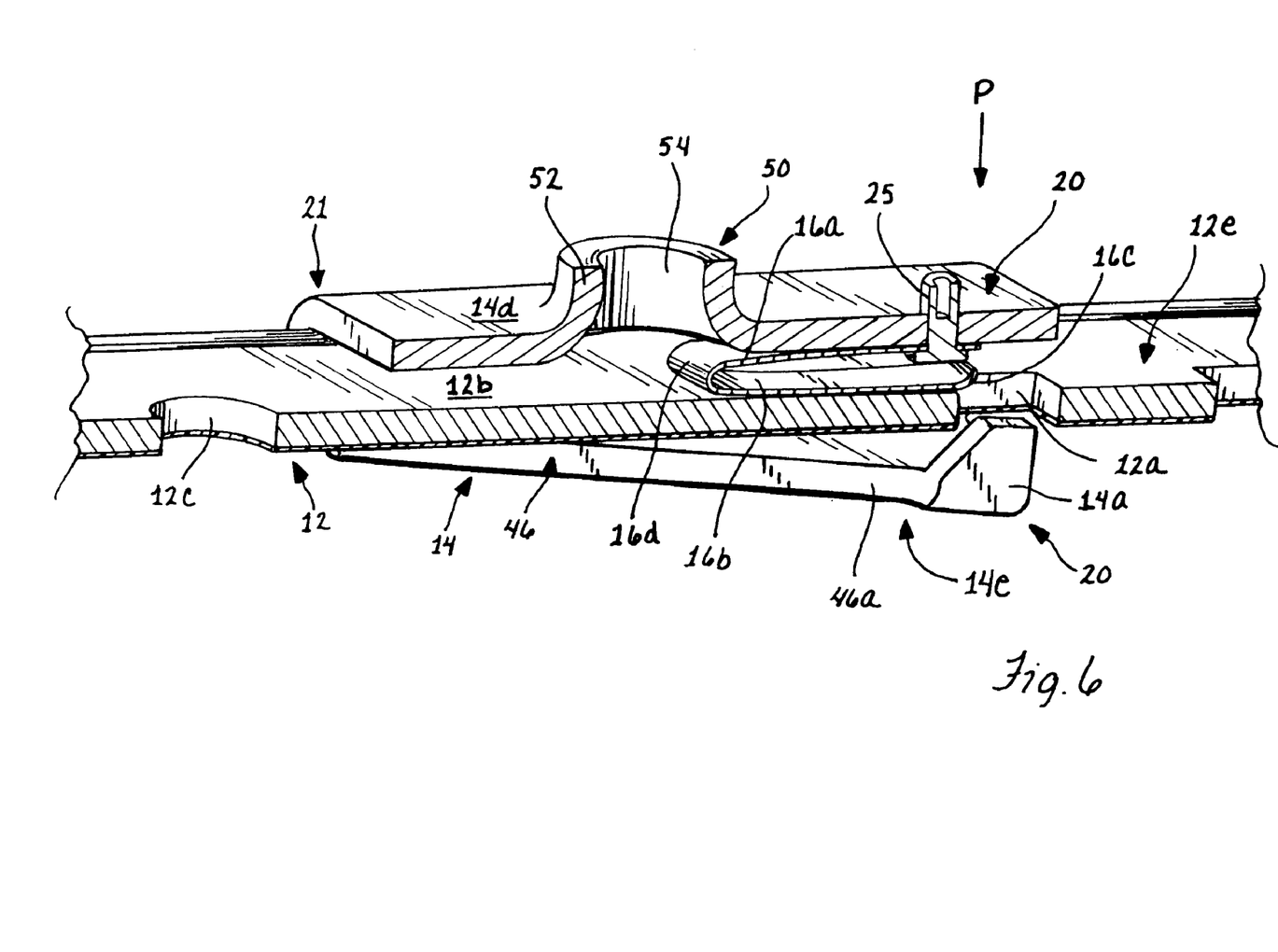
FIG. 6 is an enlarged, sectional view taken longitudinally and centrally along the rail, the spring, and the slider and showing one of the protrusions being pushed out from one of the locking openings in the rail by compressing the leaf spring.
Figure 7:
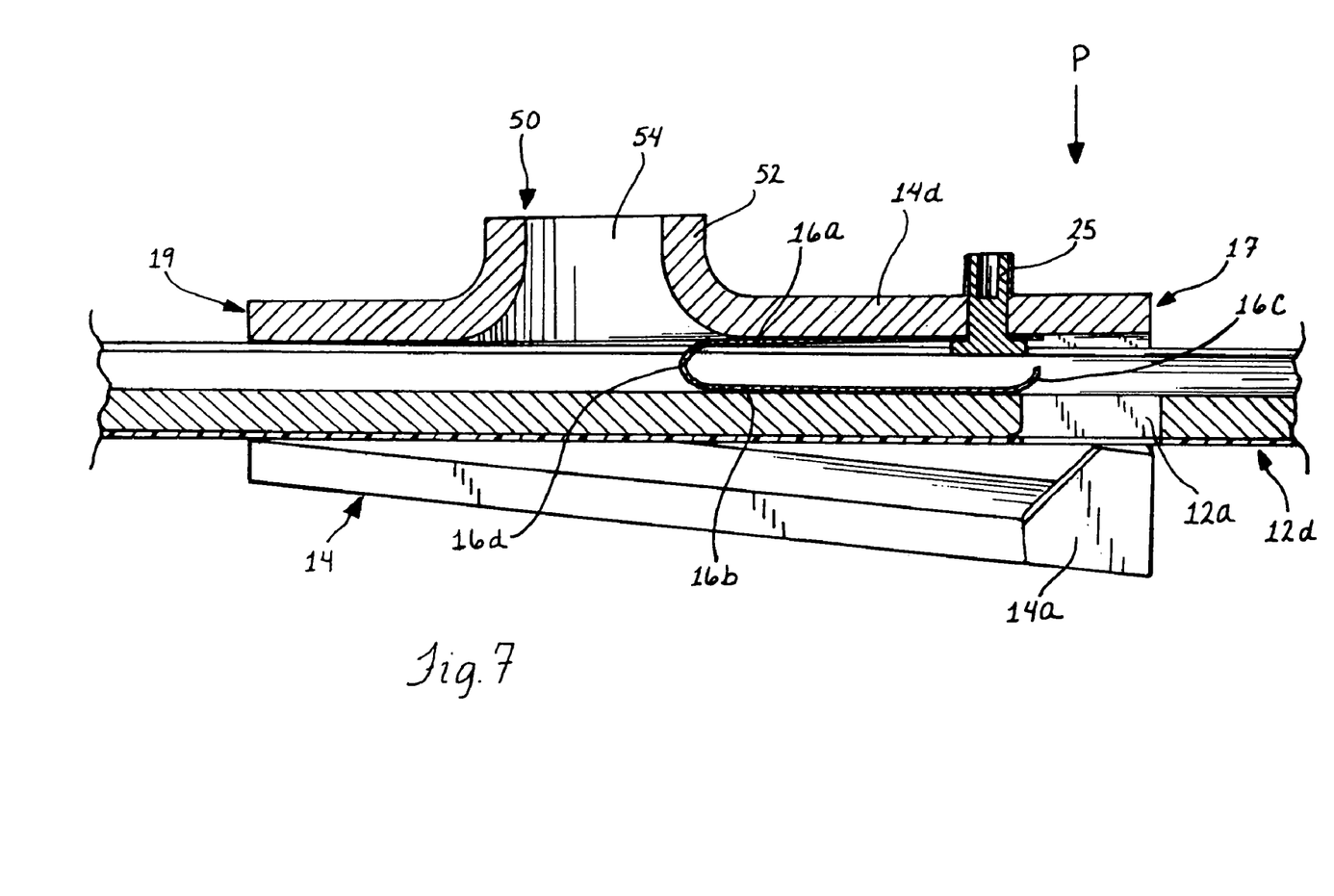
FIG. 7 is a cross-sectional view similar to FIG. 6 with the leaf spring compressed to slide the slider along the rail for adjusting the vertical height of the D-ring.

In preferred and illustrated from as can be seen in FIG. 1, the height adjuster 10 has three operating components: the elongated rail 12 on which is slidably mounted the slider 13 for sliding along the rail to adjust the height of the seat belt and D-ring assembly, and a biasing spring 16 for urging the slider 13 to a locked position. As best seen in FIGS. 4 and 5, the slider 13 is biased to the locked position in which locking protrusions or lugs 14a on the slider body 14 are engaged in one of the openings 12a formed in the rail by means of the leaf spring 16 shown in its uncompressed state. In order to shift the slider body to the release position, as best seen in FIGS. 6 and 7, the operator will push on the D-ring or on a first or lower end 20 of the slider body 14. This push force indicated by the arrow P compresses a leg 16a of the spring 16 toward the other leg 16b so that as the front side 14c at the end 20 of the slider body 14 is brought closer to front side 12e of the rail 12, the protrusions 14a leave the opening 12a in the rail.

As illustrated, the spring 16 is a very simple part to make. The spring 16 is relatively a small part which can be positioned within a large space therefor defined at the lower end 20 of the slider body 14. More specifically, the body 14 has a web wall 14d at its front side 14e that substantially spans the transverse width of the relatively flat web 12b of the rail and to the slightly raised side flanges 30 and 32 thereof. At the lower end 20 of the slider body 14, the front web 14d has its lower end 17 spaced further from the rear side 14e of the body 14 than at the upper end 19 of the web 14d which provides the spring 16 sufficient space for being mounted toward the lower end 20 of the slider body 14. The spring 16 is secured to the slider body 14 for travel therewith as by means of a fastener 25 such as the rivet shown in FIG. 6 which secures the leg 16a to and against the underside of the slider body 14. The other leg 16b is preferably situated against the interior side 12e of the rail web 12b to slide therealong and is preferably formed with an inturned end 16c as best seen in FIGS. 1 and 6. The end 16c is turned up to extend toward the front web wall 14d near the lower end 17 thereof and thus provides a curved or rounded surface which can slide along the front 12e of the web wall portion 12b of the rail. Because the spring 16 is wider than the openings 12a in the rail, it will freely slide thereover. The curved surface of the end portion 16c will not catch on the edges of the openings 12a when the spring slides across any opening 12a in either direction. The spring 16 is a simple U or V-shaped leaf spring-type member and has an intermediate curved portion 16d between the legs 16a and 16b to provide an inexpensive and reliable part for biasing the locking protrusions 14a into the locking position in an opening 12a in the rail 12.

Turning now in greater detail to the illustrated embodiment, the rail 12 is of metal material such as steel, and has a one-piece construction with a pair of slightly raised, side flanges 30 and 32 that extend laterally from the central web portion 12b. The central web 12b has the spaced rectangular holes or openings 12a therein. In other instances the rail could be formed with a different shape having spaced rows of openings in the central web 12b such as two rows of openings in the central web portion 12b. In still other instances, the openings 12a may be formed in the respective side flanges 30 and 32 rather than in the central web. The illustrated construction is preferred in that it provides a relatively strong, inexpensive rail. At the ends of the rail are circular holes or openings 12c to bolt the rail to a pillar or other portion of a vehicle.

Turning now to the slider 13, it is seen that the body 14 has a generally C-shaped cross-section formed by a stamping of metal material, preferably without any welding or other connected portions, so that the slide body 14 is one integral piece. The integral body 14 of the slider 13 is formed with the pair of inturned side-walls or legs 14b which extend downwardly from either lateral side of the slider front web 14d and include a pair of underside portions 46 (one of which is shown in FIGS. 5 and 6) integrally formed on the ends of the legs 14b and extending laterally inward toward each other so as to slide along the back side 12d of the rail 12. These underside portions 46 also extend longitudinally along the rear side 14e of the slider body 14. The slider front web 14d and rear portions 46 extend at an incline relative to each other so that they are closer at the upper end 21 of the slider body 14 than at the lower end 27 thereof.

The protrusions 14a are in the form of lugs or tabs formed integrally with and projecting upwardly from the inner ends 46a of the underside portions 46. The ends 46a of the underside portions 46 are generally parallel edges 46a (FIG. 3) which define an elongated slot 47 therebetween. This slot 47 is formed on the back or underside 14e of the slider body. The inturned legs 14b including portions 46 thereof on the slider body 14 wrap around, as best seen in FIG. 2, the lateral edges of the respective side flanges 30 and 32 of the rail. The upper web 14d of the slider body is located to slide along the top of the rail flanges 30 and 32 at the rail front side 12e when the spring 16 is compressed (FIG. 7) against its bias force and the protrusions 14a are removed from a rail opening 12a. When the spring 16 is not compressed (FIG. 4) or spaced from the bias force of the spring 16 pushes the front web wall 14d at the lower end 20 of the slider 14 to be substantially above or spaced from the flanges 32 and 30 of the rail 12 when the slider is in its locking position. The slider web 14d at its upper end 19 engages the side edges of the flanges 30 and 32 when the slider body is in the locking position, as shown in FIG. 4. The upper web 14d thus is inclined relative to the rail 12 as it extends between the upper and lower ends of the slider body 14 with the underside portions 46 extending generally parallel to the rail 12 along the bottom or rear side 12d thereof, as best seen in FIGS. 4 and 5.

For the purpose of mounting the bolt, to which the D-ring is attached, the slider body 14 is formed with an upturned aperture 50 punched out and formed out of the metal of the web 14d the slider body. The upturned aperture 50 includes integrally upwardly or outwardly extending annular wall 52 which defines a central opening 54 therein into which the bolt for the slider assembly is received. The D-ring is mounted to swivel about the axis of the bolt in a well-known manner.

For adjusting the height of the D-ring, the push force P exerted on the front web 14d, either directly or via the connected D-ring, compresses the spring 16 and pivots the slider body 14 about its upper end 21. When the slider 13 is pushed by the vehicle occupant at the lower end 20, the mechanical advantage provided by the lever arm formed by the slider body 14 via the upper fulcrum end 21 allows for easy unlocking of the slider 13 from the rail 12 for sliding therealong. This pivoting of the slider body 14 causes the underside portions 46 to shift away from back side 12d of the rail 12 particularly at the body lower end 20 at which the locking lugs 14a are formed. The spacing of the web wall 14d from the underside portions 46 along with the size of the lugs 14a is such that the pivoting action of the slider body 14 will shift the lights 14a out from the corresponding locking openings 12a in the rail 12. Accordingly, in the unlocked position, the underside portions 46 of the slider body 14 are inclined relative to the rail 12 as they extend between the upper and lower ends of the slider body 14 with the slider web 14d extending in more of a parallel orientation along the front side 12e of the rail 12, as best seen in FIGS. 6 and 7.

Referring to FIG. 1 there may also be provided a piece of trim cover 60 for the rail 12. The illustrated trim cover 60 has a one-piece integral body, usually of molded plastic with a pair of opposed slide channels 60a and 60b which are sized and spaced to receive therein the respective side flanges 30 and 32 of the rail 12. That is, the trim cover is slid over the rail flanges 30 and 32 to bring a set of openings 60d in the trim cover 60 into alignment with the openings 12a in the rail. Also, a pair of circular openings 60c are formed at the opposite ends of the trim cover for alignment with bolt receiving openings 12c in the rail to receive bolts to secure the rail 12 together with the trim cover 60 to the vehicle.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A height adjuster for a seat belt D-ring, the height adjuster comprising:
    a vertically extending, elongated guide rail and having at least one row of vertically spaced openings;
    a one piece, slider movable vertically along the rail to adjust the height of the D-ring;
    a locking protrusion on one end of the slider for engaging into a selected one of the vertically spaced openings on the rail;
    a portion of the slider at one end thereof having a spaced position from the rail for being pushed to pivot toward the rail to remove the locking protrusion from the locking opening in the rail to allow the slider to be shifted vertically for height adjustment;
    a single bent spring positioned between the rail and the slider portion for biasing the one end of the slider portion to its spaced position and biasing the locking protrusion into the locking position in the selected one of the openings in the rail, the one end of the slider portion being pushed against the spring force to compress the bent spring and to pivot the slider about its other end to remove the locking protrusion from the rail opening; and
    an interior space between the rail and the slider with the single bent spring being sized to fit entirely within the interior space.

2. A height adjuster in accordance with claim 1 wherein the single bent spring comprises:
    a spring body secured to the slider for travel therewith; and
    a bent spring leg sliding along the rail as the slider is moved vertically along the rail to adjust the height of the slider on the rail.

3. A height adjuster in accordance with claim 2 wherein the spring body comprises:
    a second leg on the spring body disposed against and secured to the slider.

4. A height adjuster in accordance with claim 3 comprising:
    a fastener fastening the second leg of the spring body at the one end of the slider.

5. A height adjuster in accordance with claim 1 wherein the slider portion is a web wall having one end thereof spaced at a greater distance from the rail than its other end with the locking protrusion biased into one of the rail openings so that the web wall is inclined relative to the rail.

6. A height adjuster in accordance with claim 5 wherein the spring is mounted to the slider web wall between the respective ends of the slider.

7. A height adjuster in accordance with claim 1 wherein the slider has an opening therein, and
    a fastener mounted in the opening to fasten the bent spring to the slider.

8. A height adjuster for a seat belt D-ring, the height adjuster comprising:
    a vertically extending rail having a row of vertically spaced openings therein;
    a one piece, slider mounted on the rail for sliding thereaLong to adjust the height of the D-ring;
    the slider having a substantially U-shaped slider body and inturned legs for sliding along the underside of the rail,
    integral protrusions formed on the inturned legs for projecting into the openings in the rail to locate the slider at predetermined height locations along the rail; and
    a one piece bent spring located between the rail and the slider and biasing the slider to insert the protrusions into the rail openings, the spring being compressible by pushing on the slider to remove the protrusions from the rail openings to allow a height adjustment movement of the slider along the rail.

9. The height adjuster of claim 8 comprising:
    an upper end of the slider including a portion spaced from a front side of the rail to accommodate the bent spring between the rail and the slider portion; and
    the protrusions being located at the underside of the rail and the upper end of the slider.

10. A height adjuster in accordance with claim 8 wherein the bent spring comprises:
    a substantially U-shaped body having first and second legs;
    the first leg being secured to the slider; and
    the second leg sliding along the rail as the slider is shifted vertically on the rail.

11. A height adjuster in accordance with claim 8 comprising:

a central web on the slider body having the inturned legs integrally formed along vertical edges of the central web; and the slider having opposite upper and lower ends with the central web being spaced at a greater distance from the rail at the slider lower end than at the upper end with the protrusions in one of the openings to accommodate the spring between the central web at the slider lower end and the rail and to allow movement of the central web of the slider lower end toward the rail to remove the protrusions from the rail opening.

* * * * *